(12) United States Patent
Furukawa (10) Patent No.: US 10,924,270 B2
(45) Date of Patent: Feb. 16, 2021

(54) SECRET CALCULATION SYSTEM, SECRET CALCULATION APPARATUS, AND SECRET CALCULATION METHOD

(71) Applicant: NEC CORPORATION, Tokyo (JP)

(72) Inventor: Jun Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 266 days.

(21) Appl. No.: 15/755,888

(22) PCT Filed: Aug. 29, 2016

(86) PCT No.: PCT/JP2016/075186
§ 371 (c)(1),
(2) Date: Feb. 27, 2018

(87) PCT Pub. No.: WO2017/038761
PCT Pub. Date: Mar. 9, 2017

(65) Prior Publication Data
US 2018/0270057 A1 Sep. 20, 2018

(30) Foreign Application Priority Data

Aug. 31, 2015 (JP) .............................. JP2015-169992

(51) Int. Cl.
*H04L 9/08* (2006.01)
*G09C 1/00* (2006.01)
(Continued)

(52) U.S. Cl.
CPC ............ *H04L 9/0861* (2013.01); *G06F 7/485* (2013.01); *G06F 7/5443* (2013.01); *G06F 7/582* (2013.01);
(Continued)

(58) Field of Classification Search
None
See application file for complete search history.

(56) References Cited

U.S. PATENT DOCUMENTS 8,977,847 B1 * 3/2015 Juels ..................... H04L 9/3271
713/162
9,064,123 B2 6/2015 Ikarashi
(Continued)

FOREIGN PATENT DOCUMENTS

JP    2011-199821 A   10/2011
WO   2009/093603 A1   7/2009
(Continued)

OTHER PUBLICATIONS

Communication dated Apr. 18, 2019 from the European Patent Office in application No. 16841793.9.
(Continued)

*Primary Examiner* — Henry Tsang
(74) *Attorney, Agent, or Firm* — Sughrue Mion, PLLC (57) ABSTRACT

The secret calculation system comprises three secret calculation apparatuses. An $i^{th}$ secret calculation apparatus (i=1, 2, 3) comprises a holder that holds (S[i], T[i]) and (S'[i], T'[i]) as distributed values of an n-bit number W and an n-bit W' (n is any natural number), respectively; a first multiplicator that derives a logical conjunction of S[i] and S'[i]; a second multiplicator that derives a logical conjunction of T[i] and T'[i]; and a first subtractor that derives a difference between the logical conjunction derived by the first multiplicator and the logical conjunction derived by the second multiplicator.

10 Claims, 4 Drawing Sheets

(51) Int. Cl.
*G06F 7/485* (2006.01)
*G06F 7/544* (2006.01)
*G06F 7/58* (2006.01)
*G06F 7/72* (2006.01)

(52) U.S. Cl.
CPC .............. *G06F 7/727* (2013.01); *G09C 1/00* (2013.01); *H04L 9/085* (2013.01); *H04L 2209/46* (2013.01)

(56) References Cited

U.S. PATENT DOCUMENTS

| | | | |
|---|---|---|---|
| 9,077,539 | B2 | 7/2015 | Kamara et al. |
| 9,292,258 | B2 | 3/2016 | Ikarashi et al. |
| 9,300,469 | B2 | 3/2016 | Chida |
| 2011/0040963 | A1 | 2/2011 | Chida |
| 2011/0138192 | A1* | 6/2011 | Kocher ................ G06F 21/575 713/189 |
| 2012/0185946 | A1* | 7/2012 | Kamara ................ G06F 9/5072 726/26 |
| 2012/0233460 | A1 | 9/2012 | Kamara et al. |
| 2013/0304780 | A1* | 11/2013 | Ikarashi ................ H04L 9/085 708/250 |
| 2013/0339728 | A1* | 12/2013 | Ikarashi ................ H04L 9/085 713/164 |
| 2015/0358155 | A1* | 12/2015 | Ikarashi ................ H04L 9/085 713/189 |

FOREIGN PATENT DOCUMENTS

| | | |
|---|---|---|
| WO | 2012/102203 A1 | 8/2012 |
| WO | 2012/121333 A1 | 9/2012 |
| WO | 2014/112548 A1 | 7/2014 |

OTHER PUBLICATIONS

Bogdanov, Dan, et al., "High-performance secure multi-party computation for data mining applications", International Journal of Information Security, vol. 11, No. 6, 2012, 28 pages.

Araki, Toshinori, et al., "High-Throughput Semi-Honest Secure Three-Party Computation with an Honest Majority", Computer and Communications Security, 2016, pp. 805-817 (14 pages).

Tal Rabin et al., "Verifiable Secret Sharing and Multiparty Protocols with Honest Majority (Extended Abstract)", STOC 1989, pp. 73-85.

Oded Goldreich, "How to Solve any Protocol Problem—An Efficiency Improvement," CRYPTO 1987, pp. 73-86.

International Search Report of PCT/JP2016/075186 dated Oct. 11, 2016 [PCT/ISA/210].

* cited by examiner

FIG. 1

FIG. 2  SECRET CALCULATION SYSTEM 100

SECRET CALCULATION SYSTEM, SECRET CALCULATION APPARATUS, AND SECRET CALCULATION METHOD

CROSS REFERENCE TO RELATED APPLICATIONS

This application is a National Stage of International Application No. PCT/JP2016/075186, filed Aug. 29, 2016, claiming priority based on Japanese Patent Application No. 2015-169992, Aug. 31, 2015, the disclosures of which are incorporated herein in their entirety by reference thereto.

TECHNICAL FIELD

The present invention relates to a secret calculation apparatus, secret calculation system, and secret calculation method, and particularly to a secret calculation system, in which a plurality of secret calculation apparatuses calculate an output of a given function while communicating with each other and input/output information for the function cannot be obtained unless data is shared by a predetermined number of the secret calculation apparatuses, a secret calculation apparatus that constitutes such a secret calculation system, and a secret calculation method by the secret calculation system.

BACKGROUND

Non-Patent Literature (NPL) 1 describes a secret calculation method that divides a secret S, which is a value on a field, and distributes it among a plurality of apparatuses using a polynomial F that satisfies F(0)=S in the polynomial F on the field.

Further, Non-Patent Literature 2 describes a secret calculation method when the number of apparatuses is two.

[NPL 1]
Tal Rabin, Michael Ben-Or, "Verifiable Secret Sharing and Multiparty Protocols with Honest Majority (Extended Abstract)," STOC 1989, pp. 73-85.

[NPL 2]
Oded Goldreich, Ronen Vainish, "How to Solve any Protocol Problem—An Efficiency Improvement," CRYPTO 1987, pp. 73-86.

SUMMARY

Each disclosure of Non-Patent Literatures 1 and 2 cited above is incorporated herein in its entirety by reference thereto. The following analysis is given by the present inventor.

In the method described in Non-Patent Literature 1, a value (secret S) on a field is divided and distributed among a plurality of apparatuses using a polynomial F that satisfies F(0)=S in the polynomial F on the field. Here, let us assume that the number of the apparatuses is N and that input/output information for a function cannot be obtained when the number of the apparatuses is less than K. Further, we'll assume that different values on the field are assigned to all the apparatuses. Specifically, the value on the field assigned to an apparatus i is $X[i]$ ($i=1, \ldots, N$). When a secret A is divided and distributed among the plurality of apparatuses, $F[i]:=F(X[i])$ related to a $(K-1)^{th}$ order polynomial F randomly selected where F(0)=A is given to the $i^{th}$ apparatus. Similarly for a secret B, $G[i]:=G(X[i])$ related to a $(K-1)^{th}$ order polynomial G where G(0)=B is given to the $i^{th}$ apparatus. The $(K-1)^{th}$ order polynomials F and G (i.e., the coefficients of F and G) can be derived when K number of apparatuses or more get together. In other words, F(0) and G(0) can be calculated and the secrets A and B can be derived.

At this time, in order to calculate the value obtained by dividing and distributing A+B, the $i^{th}$ apparatus calculate $H[i]=F[i]+G[i]$. This value is $H(X[i])$ obtained by plugging $X[i]$ into a polynomial H with a coefficient obtained by adding the corresponding coefficients of F and G. Therefore, A+B is divided and distributed among a plurality of apparatuses as A and B. As in the case of A and B, K number of apparatuses or more can derive the $(K-1)^{th}$ order polynomial H (i.e., the coefficient of the polynomial H). In other words, H(0) can be calculated and the secret A+B can be derived.

Further, in a case of $2K \leq N+1$, in order to calculate values obtained by dividing and distributing A*B, the $i^{th}$ apparatus calculate $H[i]=F[i]*G[i]$. This value is $H(X[i])$ obtained by plugging $X[i]$ into a 2K-degree polynomial $H(X)=F(X)*G(X)$. Therefore, A*B is divided and distributed among a plurality of apparatuses as A and B. It should be note that the degree of H is 2K unlike the case of A and B. As a result, 2K number of apparatuses or more can derive the 2K-degree polynomial H (i.e., the coefficient of the polynomial H), making it possible to calculate H(0). Here, A*B is divided and distributed differently from A and B. In order to divide and distribute A*B using the $(K-1)^{th}$ order polynomial in the same way as A and B are divided and distributed, the $i^{th}$ apparatus generates a $(K-1)^{th}$ polynomial G from H[i] and gives G(X[i]) to a $j^{th}$ apparatus. As described, all functions involving addition and multiplication can be calculated.

According to the method described in Non-Patent Literature 1, multiplication and addition on a field is easily performed. $2K \leq N+1$, however, is imposed as a condition. Further, if K is less than 2, a single apparatus will be able to derive the secret. Therefore, N should be 3 or greater. Since X[i] should be a different value for a different i, available fields do not include GF(2). Since available fields do not include GF(2), exclusive OR cannot be performed using addition.

Non-Patent Literature 2 describes the method using two apparatuses. In this method, when a bit, i.e., an element b on GF(2), is divided and distributed between two apparatuses, b and c where b+c=b mod 2 is divided and distributed between the two apparatuses. In such a method, when bits A and B are divided and distributed between apparatuses 1 and 2, the apparatus 1 holds C and E, and the apparatus 2 holds D and F where A=C+D mod 2, B=E+F mod 2. At this time, G=A+B mod 2 where G is the exclusive OR of A and B, and the apparatuses 1 and 2 hold H=C+E mod 2 and J=D+F mod 2, respectively. Each apparatus is able to calculate the dividing and distributing of the exclusive OR of the two distributed values with a small calculation amount without communicating with the other apparatus.

Similarly, when A and B are divided and distributed, out of L and M where L+M=K mod 2, i.e., each fragment of K=A·B, the logical conjunction of these two bits, the apparatus 1 obtains L and the apparatus 2 obtains M as follows. The apparatus 1 randomly generates L. At this time, M=(C+D)·(E+F)=L mod 2. Then, depending on the values of D and F held by the apparatus 2, the apparatus 1 returns the following to the apparatus 2 without knowing the value of M: M=(C+0)·(E+0)+L mod 2 when (D, F)=(0, 0); M=(C+0)·(1+E)+L mod 2 when (D, F)=(0, 1); M=(1+C)·(E+0)+L mod 2 when (D, F)=(1, 0); and M=(1+C)·(1+E)+L mod 2 when (D, F)=(1, 1). In other words, the value sent by the apparatus 1 to the apparatus 2 depends on the input to the apparatus 2. A technology between the apparatuses 1 and 2 called oblivious transfer is used to make sure that the apparatus 1 is oblivious of the input to the apparatus 2. According to such a technology, however, the apparatuses 1 and 2 will require a large amount of calculation and communication.

According to the method described in Non-Patent Literature 1, it becomes possible to calculate logical conjunction in a distributed manner with a small amount of communication and calculation. In the method described in Non-Patent Literature 1, however, calculating exclusive OR in a distributed manner requires communication and a certain amount of calculation as in the case of logical conjunction calculation.

Meanwhile, the method described in Non-Patent Literature 2 has an advantage that calculating exclusive OR in a distributed manner does not require communication. In the method described in Non-Patent Literature 2, however, logical conjunction requires communication as well as calculation.

Therefore, what is desired is to enable a plurality of apparatuses to calculate the original exclusive OR of the bit, i.e., GF(2), in a distributed manner without having these apparatuses communicate with each other and to calculate the logical conjunction of the bit in a distributed manner with a small amount of communication and calculation as well. By achieving this, it becomes possible to have a plurality of apparatuses calculate a function in a distributed manner at high speed without letting any of the apparatuses know (calculate) the data by breaking the function into logic gates and describing it with exclusive OR and logical conjunction.

It is an object of the present invention to provide a secret calculation system, secret calculation apparatus, and secret calculation method realizing a secret calculation in which addition is easy and the amount of communication and calculation required for multiplication is small.

A secret calculation system relating to a first aspect of the present invention comprises three secret calculation apparatuses. An $i^{th}$ secret calculation apparatus (i=1, 2, 3) comprises a holder that holds (S[i], T[i]) and (S'[i], T'[i]) as distributed values of an n-bit number W and an n-bit W' (n=any natural number), respectively. Further, the $i^{th}$ secret calculation apparatus comprises a first multiplicator that derives a logical conjunction of S[i] and S'[i], and a second multiplicator that derives a logical conjunction of T[i] and T'[i]. Further, the $i^{th}$ secret calculation apparatus comprises a first subtractor that derives a difference between the logical conjunction derived by the first multiplicator and the logical conjunction derived by the second multiplicator.

A secret calculation apparatus relating to a second aspect of the present invention is a secret calculation apparatus included in the secret calculation system.

A secret calculation method relating to a third aspect of the present invention uses three secret calculation apparatuses. The secret calculation method includes having an $i^{th}$ secret calculation apparatus (i=1, 2, 3) hold (S[i], T[i]) and (S'[i], T'[i]) as distributed values of an n-bit number W and an n-bit W' (n is any natural number), respectively. Further, the secret calculation method includes deriving a logical conjunction of S[i] and S'[i] as a first logical conjunction, and deriving a logical conjunction of T[i] and T'[i] as a second logical conjunction. Further, the secret calculation method includes deriving a difference between the first logical conjunction and the second logical conjunction.

The secret calculation system, the secret calculation apparatus, and the secret calculation method relating to the present invention realizes a secret calculation in which addition is easy and the amount of communication and calculation required for multiplication is small.

PREFERRED MODES

First, a summary of an exemplary embodiment will be given. Note that drawing reference signs in the summary are given solely to facilitate understanding and are not intended to limit the present invention to the modes shown in the drawings.

Figure 1:
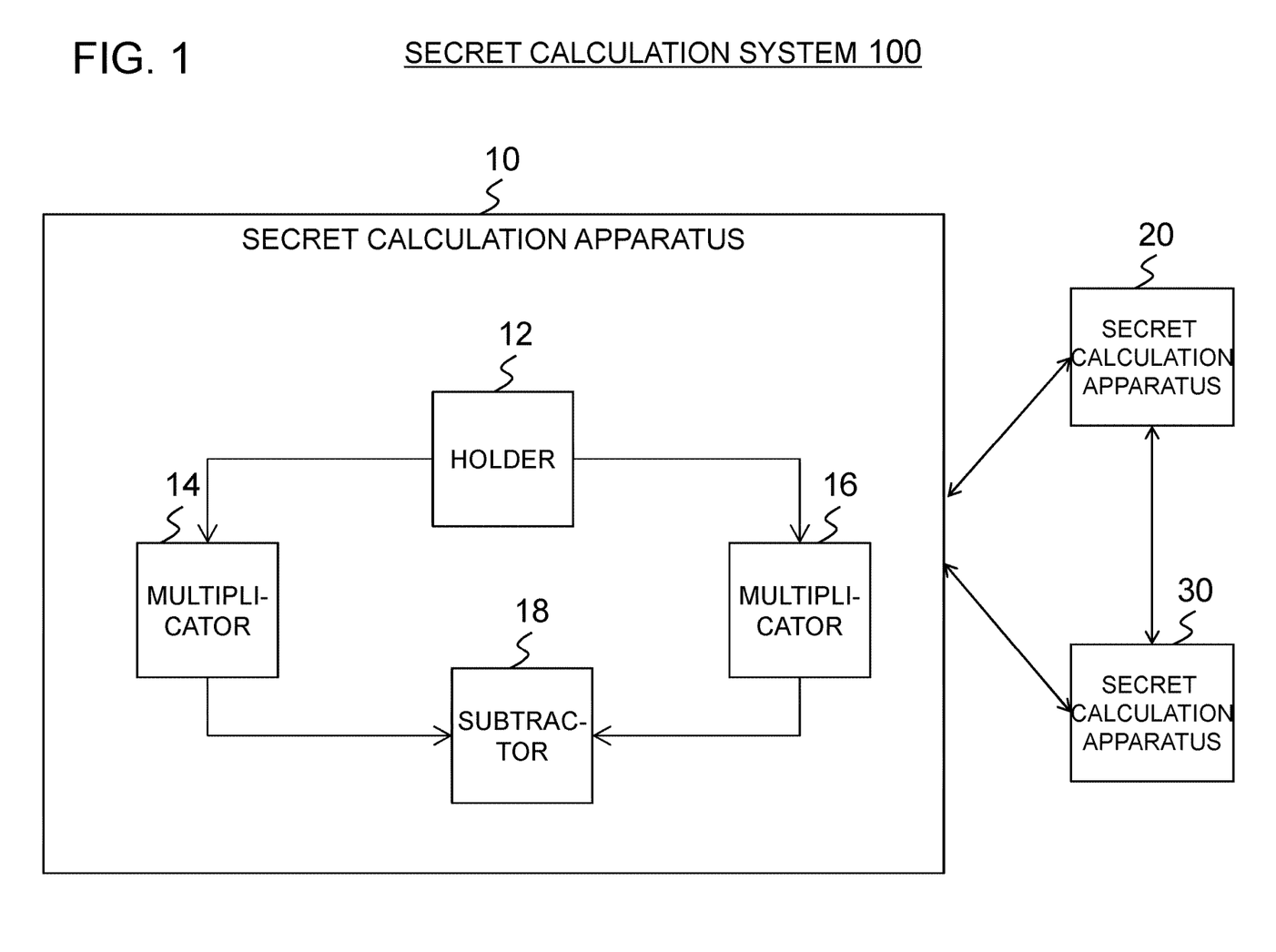
FIG. 1 is a block diagram illustrating the configuration of a secret calculation system relating to an exemplary embodiment.

FIG. 1 is a block diagram illustrating the configuration of a secret calculation system 100 relating to an exemplary embodiment. In FIG. 1, the secret calculation system 100 comprises three secret calculation apparatuses 10, 20, and 30. The secret calculation apparatuses 10, 20, and 30 will be referred to as the first, the second and the third secret calculation apparatuses, respectively. An $i^{th}$ secret calculation apparatus (i=1, 2, 3) comprises a holder 12 that holds (S[i], T[i]) and (S'[i], T'[i]) as distributed values of an n-bit number W and an n-bit W' (n is any natural number), respectively; a first multiplicator 14 that derives a logical conjunction of S[i] and S'[i]; a second multiplicator 16 that derives a logical conjunction of T[i] and T'[i]; and a first subtractor 18 that derives a difference between the logical conjunction derived by the first multiplicator 14 and the logical conjunction derived by the second multiplicator 16.

Further, when R[1], R[2], R[3] and R'[1], R'[2], R'[3] are n-bit random numbers that satisfy R[1]+R[2]+R[3]=0 mod Q, and R'[1]+R'[2]+R'[3]=0 mod Q, the distributed values are as follows.

$(S[1], T[1])=(R[1], R[3]-W \bmod Q)$, $(S[2], T[2])=(R[2], R[1]-W \bmod Q)$, $(S[3], T[3])=(R[3], R[2]-W \bmod Q)$, $(S'[1], T'[1])=(R'[1], R'[3]-W' \bmod Q)$, $(S'[2], T'[2])=(R'[2], R'[1]-W' \bmod Q)$, $(S'[3], T'[3])=(R'[3], R'[2]-W' \bmod Q)$ Here, Q is an integer coprime to 3 (for instance Q=2^n where n is a natural number).

In this secret calculation system, the $i^{th}$ apparatus is able to derive a local product element U[i]=(T[i]·T'[i]−S[i]·S'[i])/3 mod Q using the first and the second multiplicators and the first subtractor. Here, since U[1]+U[2]+U[3]=WW' mod Q, three apparatuses can cooperate to restore the logical conjunction W''=W·W' mod Q. According to the secret calculation system of an exemplary embodiment, it becomes possible to perform addition without having the apparatuses communicate with each other and calculate logical conjunction with a small amount of calculation.

Exemplary Embodiment 1

Next, a secret calculation system relating to a first exemplary embodiment will be described with reference to the drawings.

Figure 2:
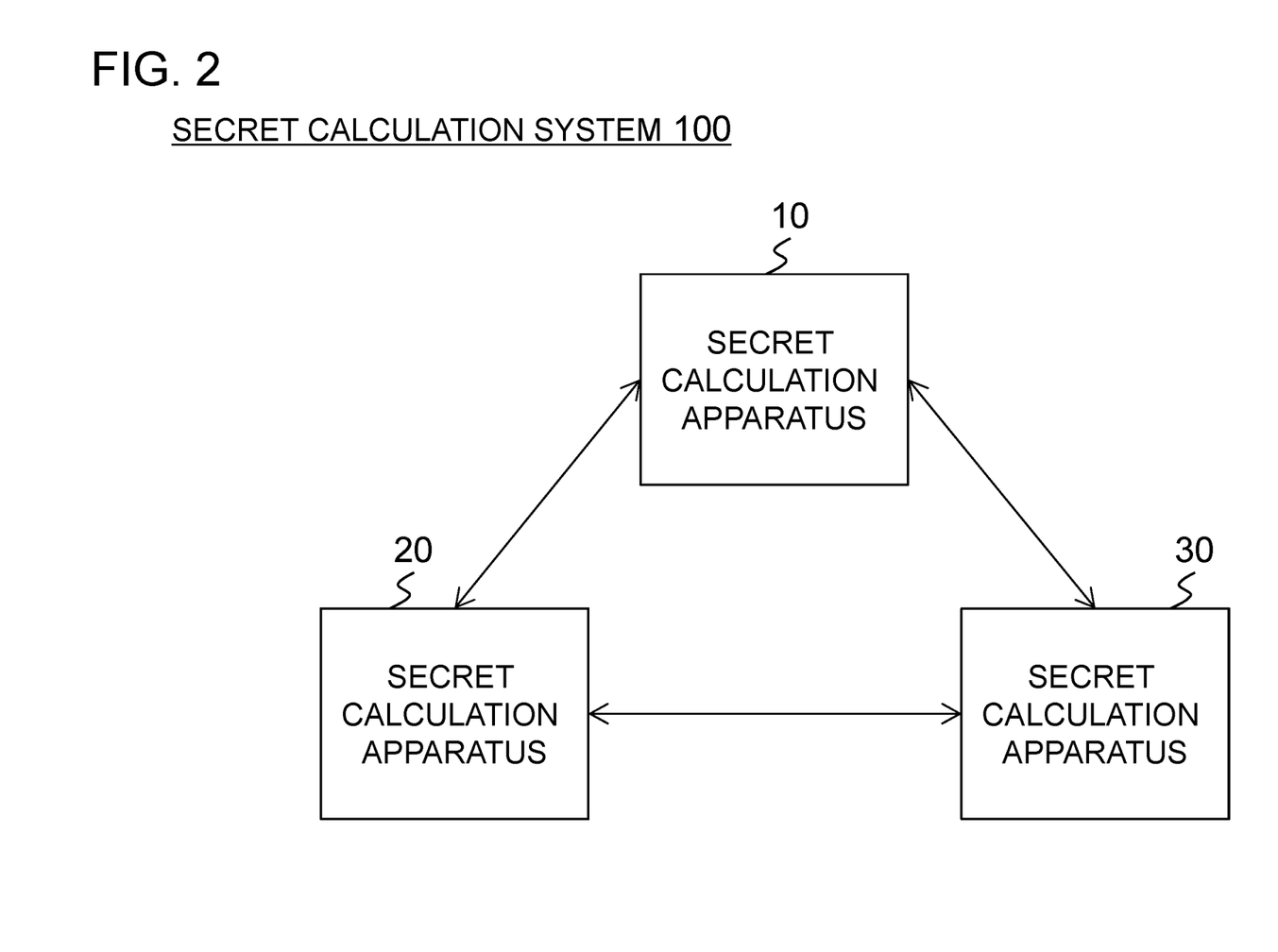
FIG. 2 is a drawing showing the configuration of a secret calculation system relating to a first exemplary embodiment.

FIG. 2 is a drawing illustrating the configuration of the secret calculation system 100 relating to the present exemplary embodiment. In FIG. 2, the secret calculation system 100 comprises three secret calculation apparatuses 10, 20, and 30.

Figure 3:
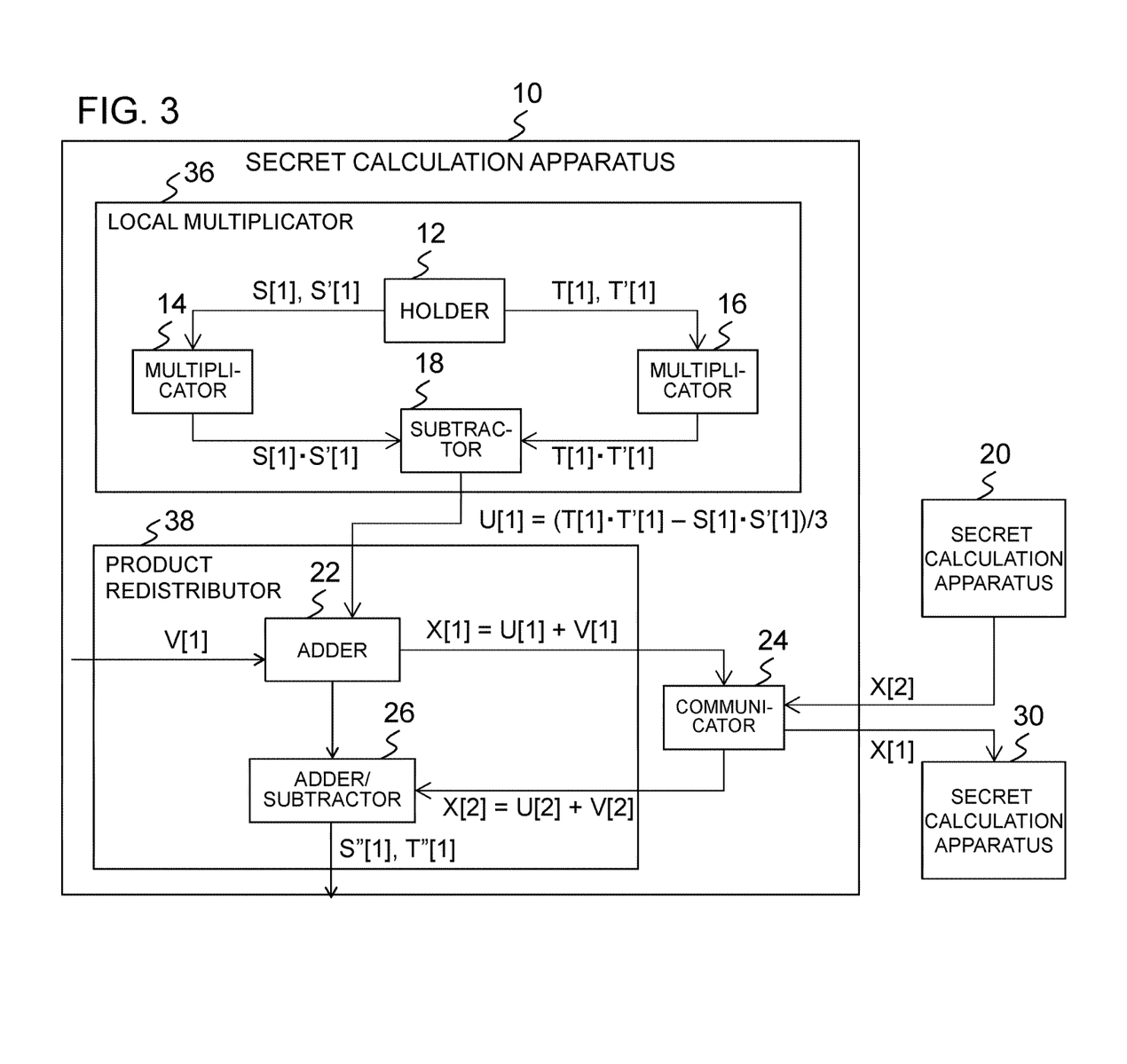
FIG. 3 is a block diagram illustrating the configuration of a secret calculation apparatus in the secret calculation system relating to the first exemplary embodiment.

FIG. 3 is a block diagram illustrating the configuration of the secret calculation apparatus 10. The secret calculation apparatuses 20 and 30 are configured identically to the secret calculation apparatus 10. In FIG. 3, the secret calculation apparatus 10 comprises a local multiplicator 36, a product redistributor 38, and a communicator 24. The local multiplicator 36 comprises the holder 12, the multiplicators 14 and 16, and the subtractor 18. The product redistributor 38 comprises an adder 22 and an adder/subtractor 26.

The secret calculation apparatuses 10, 20, and 30 divide a value W and hold the divided values. The holder 12 of the secret calculation apparatus 10 holds (R[1], R[3]−W mod Q) using three randomly selected numbers R[1], R[2], and R[3] for n, which is an integer not less than 1, where R[1]+R[2]+R[3]=0 mod Q. Similarly, the holder 12 of the secret calculation apparatus 20 holds (R[2], R[1]−W mod Q) and the holder 12 of the secret calculation apparatus 30 holds (R[3], R[2]−W mod Q). Here, Q and 3 are coprime (for instance Q=2^n where n is a natural number).

When two out of the three secret calculation apparatuses 10, 20 and 30 cooperate, they are able to restore W. Without loss of generality, when the secret calculation apparatuses 10 and 20 cooperate, such a restoration method can be explained. In other words, the value W can be restored by calculating W=R[1]−(R[1]−W) mod Q using R[1] held by the holder 12 of the secret calculation apparatus 10 and R[1]−W mod Q held by the holder 12 of the secret calculation apparatus 20.

(Addition without Communication)

Next, how the secret calculation apparatuses 10, 20, and 30 can perform addition without communicating with each other. When each of the bits W and W' is divided and distributed among the secret calculation apparatuses 10, 20, and 30 and remains divided and distributed, the addition thereof is performed as follows.

Here, it is assumed that the bit W is divided and distributed among the secret calculation apparatuses 10, 20, and 30 as follows. Using three randomly selected bits R[1], R[2], and R[3] that satisfy R[1]+R[2]+R[3]=0 mod 2, the holder 12 of the secret calculation apparatus 10 holds (S[1], T[1]):=(R[1], W+R[2] mod 2). Similarly, the holder 12 of the secret calculation apparatus 20 holds (S[2], T[2]):=(R[2], W+R[3] mod 2), and the holder 12 of the secret calculation apparatus 30 holds (S[3], T[3]):=(R[3], W+R[1] mod 2).

Meanwhile, it is assumed that the bit W' is divided and distributed among the secret calculation apparatuses 10, 20, and 30 as follows.

Using three randomly selected bits R'[1], R'[2], and R'[3] where R'[1]+R'[2]+R'[3]=0 mod 2, the holder 12 of the secret calculation apparatus 10 holds (S'[1], T'[1]):=(R'[1], W'+R'[2] mod 2). Similarly, the holder 12 of the secret calculation apparatus 20 holds (S'[2], T'[2]):=(R'[2], W'+R'[3] mod 2), and the holder 12 of the secret calculation apparatus 30 holds (S'[3], T'[3]):=(R'[3], W'+R'[1] mod 2).

At this time, the secret calculation apparatus 10 calculates (S"[1], T"[1])=(S[1]+S'[1] mod 2, T[1]+T'[1] mod 2). Similarly, the secret calculation apparatus 20 calculates (S"[2], T"[2])=(S[2]+S'[2] mod 2, T[2]+T'[2] mod 2). Further, the secret calculation apparatus 30 calculates (S"[3], T"[3])=(S[3]+S'[3] mod 2, T[3]+T'[3] mod 2). Each of the secret calculation apparatuses 10, 20, and 30 holds the respective calculation result thereby holding W"=W+W' mod 2 in a distributed manner. W" can be restored from these results as the original W or W'. Therefore, addition can be performed without having the secret calculation apparatuses 10, 20, and 30 communicate with each other.

(Negation)

Next, the operation of negation will be described. When the bit W is divided and distributed among the apparatuses 10, 20, and 30, the bit W is negated while remaining distributed as follows.

The bit W is assumed to be distributed among the secret calculation apparatuses 10, 20, and 30 as follows. Using three randomly selected bits R[1], R[2], and R[3] where R[1]+R[2]+R[3]=0 mod 2, the holder 12 of the secret calculation apparatus 10 holds (S[1], T[1]):=(R[1], W+R[2] mod 2). Similarly, the holder 12 of the secret calculation apparatus 20 holds (S[2], T[2]):=(R[2], W+R[3] mod 2). Further, the holder 12 of the secret calculation apparatus 30 holds (S[3], T[3])=(R[3], W+R[1] mod 2).

At this time, the secret calculation apparatus 10 calculates (S'[1], T'[1])=(S[1], T[1]+1 mod 2). Similarly, the secret calculation apparatus 20 calculates (S'[2], T'[2])=(S[2], T[2]+1 mod 2). Further, the secret calculation apparatus 30 calculates (S'[3], T'[3])=(S[3], T[3]+1 mod 2). Each of the secret calculation apparatuses 10, 20, and 30 holds the respective calculation result thereby holding W'=W+1 mod 2 in a distributed manner. W' can be restored from these results as the original W'. Therefore, negation can be performed without having the secret calculation apparatuses 10, 20, and 30 communicate with each other.

(Logical Conjunction)

Next, the operation of logical conjunction will be described. The local multiplicator 36 and the product redistributor 38 shown in FIG. 3 are used in the logical conjunction operation. When the bits W and W' are divided and distributed among the secret calculation apparatuses 10, 20, and 30, the logical conjunction W"=W·W' mod Q thereof is calculated while the bits remain distributed as follows.

The bit W is assumed to be distributed among the secret calculation apparatuses 10, 20, and 30 as follows. Using three randomly selected numbers R[1], R[2], and R[3] where R[1]+R[2]+R[3]=0 mod Q, the holder 12 of the secret calculation apparatus 10 holds (S[1], T[1]):=(R[1], R[3]−W mod Q). Similarly, the holder 12 of the secret calculation apparatus 20 holds (S[2], T[2]):=(R[2], R[1]−W mod 2). Further, the holder 12 of the secret calculation apparatus 30 holds (S[3], T[3])=(R[3], R[2]−W mod Q).

Meanwhile, the bit W' is assumed to be distributed among the secret calculation apparatuses 10, 20, and 30 as follows. Using three randomly selected numbers R'[1], R'[2], and R'[3] where R'[1]+R'[2]+R'[3]=0 mod Q, the holder 12 of the secret calculation apparatus 10 holds (S'[1], T'[1])=(R'[1], R'[3]−W' mod Q). Similarly, the holder 12 of the secret calculation apparatus 20 holds (S'[2], T'[2]):=(R'[2], R'[1]−W' mod Q). Further, the holder 12 of the secret calculation apparatus 30 holds (S'[3], T'[3]):=(R'[3], R'[2]−W' mod Q).

At this time, in the local multiplicator 36 of the secret calculation apparatus 10, the multiplicator 14 calculates the logical conjunction of the first element of the first input S[1] and the first element of the second input S'[1] held by the holder 12 and outputs the result to the subtractor 18. Meanwhile, the multiplicator 16 calculates the logical conjunction of the second element of the first input T[2] and the second element of the second input T'[1] and outputs the result to the subtractor 18. The subtractor 18 calculates a local product element U[1]=(T[1]·T'[1]−S[1]·S'[1])/3 mod Q on the basis of the outputs from the multiplicators 14 and 16.

Similarly, the local multiplicator 36 of the secret calculation apparatus 20 calculates a local product element U[2]=(T[2]·T'[2]−S[2]·S'[2])/3 mod Q. Further, the local multiplicator 36 of the secret calculation apparatus 30 calculates a local product element U[3]=(T[3]·T'[3]—S[3]·S'[3])/3 mod Q. With each of the calculation results, the secret calculation apparatuses 10, 20, and 30 hold W'''=W·W' mod Q in a distributed manner.

At this time, like the original W or W', the logical conjunction W''' cannot be restored only from the local product elements calculated by the secret calculation apparatuses. The logical conjunction W''' can be directly restored from the local product elements calculated by the secret calculation apparatuses by calculating W'''=U[1]+U[2]+U[3] mod Q. The following calculations indicate that the logical conjunction W''' can be restored.

$$U[1] + U[2] + U[3] =$$
$$\{(T[1] \cdot T'[1] - S[1] \cdot S'[1]) + (T[2] \cdot T'[2] - S[2] \cdot S'[2]) +$$
$$(T[3] \cdot T'[3] - S[3] \cdot S'[3])\}/3 \bmod Q =$$
$$\{-S[1]S'[1] + (R[3] - W)(R'[3] - W') - S[2]S'[2] + (R[1] - W)$$
$$(R'[1] - W') - S[3]S'[3] + (R[2] - W)(R'[2] - W')\}/3 \bmod$$
$$Q = \{-R[1]R'[1] + R[3]R'[3] - R[3]W' - WR'[3] + WW' -$$
$$R[2]R'[2] + R[1]R'[1] - R[1]W' - WR'[1] + WW' -$$
$$R[3]R'[3] + R[2]R'[2] - R[2]W' - WR'[2] + WW'\}/3$$
$$\bmod Q = 3WW'/3 \bmod Q = WW' \bmod Q$$

Further, since Q and 3 are coprime, the reciprocal of 3 mod Q can always be calculated.

As described, (U[1], U[2], U[3]) equals W·W' divided and distributed into three values. Similarly, when (U'[1], U'[2], U'[3]) equals Z divided and distributed into three values where Z=U'[1]+U'[2]+U'[3] mod Q, W·W'+Z mod Q is divided and distributed into the following three values: (U[1]+U'[1] mod Q, U[2]+U'[2] mod Q, U[3] +U'[3] mod Q). Let's assume that the secret calculation apparatus 10 holds U[1] and U'[1], the secret calculation apparatus 20 U[2] and U'[2], and the secret calculation apparatus 30 U[3] and U'[3]. In this case, each secret calculation apparatus is able to calculate the newly distributed value without communicating with the other secret calculation apparatuses. In other words, when a function is constituted by sums and products mod Q, sum operations can be performed any number of times without having the apparatuses communicate with each other until the input of a next product. When a product is calculated using the result of a product calculation, the next processing should be performed.

In order to divide the logical conjunction W''' and distribute it among the three secret calculation apparatuses in the same manner as W and W', the product redistributors 38 of the secret calculation apparatuses 10, 20, and 30 are used.

Here, there are randomly selected masks V[1], V[2], and V[3] where V[1]+V[2]+V[3]=0 mod Q, and the mask V[1] is given to the secret calculation apparatus 10, the mask V[2] to the secret calculation apparatus 20, and the mask V[3] to the secret calculation apparatus 30 in advance.

The secret calculation apparatuses 10, 20, and 30 supplies a given mask V[i] to the product redistributor 38. The adder 22 of the secret calculation apparatus 30 calculates the sum of the local product element U[3] and the mask V[3] as in X[3]=U[3]+V[3] mod Q and calls the result a first sum X[3]. Then the communicator 24 of the secret calculation apparatus 30 transmits the derived first sum X[3] to the secret calculation apparatus 20. Similarly, the adder 22 of the secret calculation apparatus 20 generates a first sum X[2]=U[2]+V[2] mod n^2 and transmits the generated first sum X[2] to the secret calculation apparatus 10 via the communicator 24 of the secret calculation apparatus 20. Further, the adder 22 of the secret calculation apparatus 10 generates a first sum X[1]=U[1]+V[1] mod Q and transmits the generated first sum X[1] to the secret calculation apparatus 30 via the communicator 24 of the secret calculation apparatus 10.

The secret calculation apparatuses 10, 20, and 30 receive the first sums X[2], X[3], and X[1], respectively, from the communicators 24 and output the received first sums X[2], X[3], and X[1] to the adder/subtractors 26. Each of the secret calculation apparatuses 10, 20, and 30 calculates an output first element S'''[i] and an output second element T'''[i] using the first sums X[1], X[2], and X[3] calculated by its own adder 22 and the received first sums X[2], X[3], and X[1]. More concretely, the adder/subtractor 26 of the secret calculation apparatus 10 calculates (S'''[1], T'''[1])=(X[1]−X[2] mod Q, −2X[1]−X[2] mod Q). Similarly, the adder/subtractor 26 of the secret calculation apparatus 20 calculates (S'''[2], T'''[2])=(X[2]−X[3] mod Q, −2X[2]−X[3] mod Q). Further, the adder/subtractor 26 of the secret calculation apparatus 30 calculates (S'''[3], T'''[3])=(X[3]−X[1] mod Q, −2X[3]−X[1] mod Q).

Without loss of generality, the fact that the value of the logical conjunction W''', like W and W', can be restored by two secret calculation apparatuses can be explained on the basis of the restoration method in the case where the secret calculation apparatuses 10 and 20 cooperate with each other. In other words, the logical conjunction W''' can be restored using the output first element S'''[1] from the secret calculation apparatus 10 and the output second element T'''[2] from the secret calculation apparatus 20 as follows.

$$W \cdot W' =$$
$$S''[1] - T''[2] \bmod Q = U[1] + V[1] + U[2] + U[3] + V[2] + V[3] \bmod Q =$$
$$U[1] + U[2] + U[3] \bmod Q = W''$$

Further, the following calculation shows the logical conjunction W''' is divided and distributed as W and W'.

$$S''[1] + S''[2] + S''[3] \bmod Q =$$
$$X[1] - X[2] + X[2] - X[3] + X[3] - X[1] \bmod Q = 0 \bmod Q$$

(Effects)

By using the secret calculation system relating to the present exemplary embodiment, the sum mod Q of two values divided and distributed among three secret calculation apparatuses can be calculated without having these secret calculation apparatuses communicate with each other and can be held by the three secret calculation apparatuses in a distributed manner. Here, a method for holding the sum calculation result is the same as the method for holding each of the two bits in the beginning.

Further, according to the secret calculation system of the present exemplary embodiment, by calculating the product mod Q of two values divided and distributed among three secret calculation apparatuses while having these secret calculation apparatuses communicate with each other, the calculation result can be held by the three secret calculation apparatuses in a distributed manner. The entire communication amount generated at this time is only 3n bits and is significantly less than the communication amount required in the secret calculation between two apparatuses described in Non-Patent Literature 2. Here, a method for holding the value of the product calculation result is the same as the method for holding each of the two values in the beginning.

As described, both product and sum calculation results are held by the same method as that for holding the values before the calculations. As a result, it becomes possible to further continue product and sum operations on the calculation results. In other words, according to the secret calculation system of the present exemplary embodiment, a function described by sum and product mod Q can be calculated using three secret calculation apparatuses with a small communication amount while the data is divided and distributed.

As described above, according to the present exemplary embodiment, any polynomial mod Q can be calculated while data is distributed and hidden among a plurality of secret calculation apparatuses. Further, the amount of communication and calculation required for such calculation can be reduced, compared with the related technologies. In a case where a service is provided with the secret calculation apparatuses handling secret data, such a secret calculation system also contributes to preventing the administrator of the secret calculation apparatuses from stealing the data. This is because, with different administrators allocated to a plurality of secret calculation apparatuses, no administrator is able to refer to the data in all the secret calculation apparatuses and this will prevent the stealing of the data by an administrator.

Exemplary Embodiment 2

Figure 4:
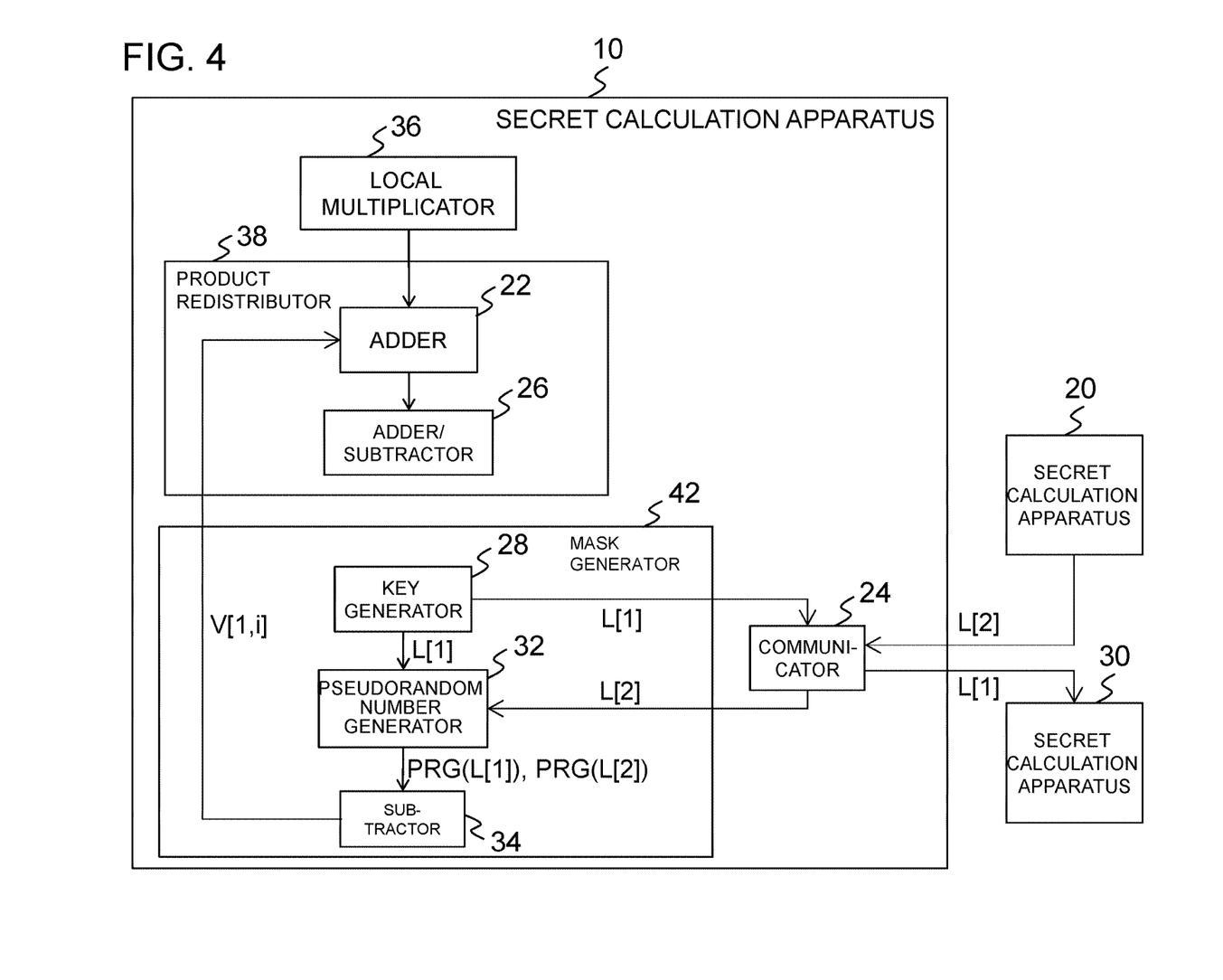
FIG. 4 is a block diagram illustrating the configuration of a secret calculation apparatus in a secret calculation system relating to a second exemplary embodiment.

Next, a secret calculation system relating to a second exemplary embodiment will be described with reference to the drawings. FIG. 4 is a block diagram illustrating the configuration of a secret calculation apparatus 10 in the secret calculation system of the present exemplary embodiment. Secret calculation apparatuses 20 and 30 are configured identically to the secret calculation apparatus 10.

In FIG. 4, in the present exemplary embodiment, the secret calculation apparatus 10 further comprises a mask generator 42, compared with the secret calculation apparatus 10 (FIG. 3) of the first exemplary embodiment. The mask generator 42 comprises a key generator 28, a pseudorandom number generator 32, and a subtractor 34. Further, since the operation of the local multiplicator 36 and the product redistributor 38 in the present exemplary embodiment is the same as that of these elements in the first exemplary embodiment, the explanation will be omitted.

In the first exemplary embodiment, it is assumed that the secret calculation apparatuses 10, 20, and 30 receive the random bits V[1], V[2], and V[3] as masks that satisfy V[1]+V[2]+V[3]=0 mod Q. A set of these random bits are required for each product calculation. Therefore, when a large amount of products are calculated, it is desirable that V[i,1], V[i,2], V[i,3] satisfying V[i,1]+V[i,2]+V[i,3]=0 mod Q be generated regarding a large number of i =1, . . . , N. In the present exemplary embodiment, the mask generator 42 achieves this.

Here, K is a safety variable. The key generators 28 of the secret calculation apparatuses 10, 20, and 30 generate K-bit keys L[1], L[2], and L[3]. The communicator 24 of the secret calculation apparatus 10 transmits the generated key L[1] to the secret calculation apparatus 30. Similarly, the communicator 24 of the secret calculation apparatus 20 transmits the generated key L[2] to the secret calculation apparatus 10. Further, the communicator 24 of the secret calculation apparatus 30 transmits the generated key L[3] to the secret calculation apparatus 20.

The communicators 24 of the secret calculation apparatuses 10, 20, and 30 receive the keys L[2], L[3], and L[1] from the secret calculation apparatuses 20, 30, and 10, respectively. The received keys will be referred to as the received keys hereinafter.

The pseudorandom number generator 32 has a pseudorandom number generator PRG. Here, the PRG is a pseudorandom number generator that outputs an nN-bit string from a K-bit string. The pseudorandom number generator 32 of the secret calculation apparatus 10 generates a first pseudorandom number PRG (L[1]) from the key L[1] and a second pseudorandom number PRG (L[2]) from the received key L[2]. The subtractor 34 generates N number of n-bit random numbers by dividing the first and the second pseudorandom numbers PRG (L[1]) and PRG (L[2]) by n bits and deriving the difference mod Q of each. Here, an $i^{th}$ n-bit random number from the first one is V[i.1] (i=1, . . . , N).

Similarly, the secret calculation apparatus 20 generates a first pseudorandom number PRG (L[2]) and a second pseudorandom number PRG (L[3]) using the pseudorandom number generator 32, and generates a string of N number of n-bit random numbers from the first and the second pseudorandom numbers PRG (L[2]) and PRG (L[3]) using the subtractor 34. Here, an $i^{th}$ n-bit random number from the first one is V[i.2] (i=1, . . . , N). Further, the secret calculation apparatus 30 similarly generates a first pseudorandom number PRG (L[3]) and a second pseudorandom number PRG (L[1]) using the pseudorandom number generator 32, and generates a string of N number of n-bit random numbers from the first and the second pseudorandom numbers PRG (L[3]) and PRG (L[1]) using the subtractor 34. Here, an $i^{th}$ n-bit random number from the first one is V[i.3] (i=1, . . . , N).

The mask generator 42 of the secret calculation apparatus 10 supplies the generated random number V[i.1] (i=1, . . . , N) to the adder 22 of the product redistributor 38. Similarly, the mask generator 42 of the secret calculation apparatus 20 supplies the generated random number V[i.2] to the adder 22 of the product redistributor 38. Further, the mask generator 42 of the secret calculation apparatus 30 supplies the generated random number V[i.3] to the adder 22 of the product redistributor 38.

The secret calculation system relating to the present exemplary embodiment brings the same effects as the secret calculation system relating to the first exemplary embodiment. Further, according to the secret calculation system of the present exemplary embodiment, it becomes possible to perform secret calculations of a large amount of products at high speed by utilizing a mask generated by the mask generator.

Further, the following modes are possible in the present invention.

[Mode 1]
As the secret calculation system relating to the first aspect.

[Mode 2]
The secret calculation system according to Mode 1, wherein the distributed values are $(S[1], T[1])=(R[1], R[3]-W \bmod Q)$, $(S[2], T[2])=(R[2], R[1]-W \bmod Q)$, $(S[3], T[3])=(R[3], R[2]-W \bmod Q)$, $(S'[1], T'[1])=(R'[1], R'[3]-W' \bmod Q)$, $(S'[2], T'[2])=(R'[2], R'[1]-W' \bmod Q)$, $(S'[3], T'[3])=(R'[3], R'[2]-W' \bmod Q)$ when R[1], R[2], R[3] and R'[1], R'[2], R'[3] are n-bit random numbers that satisfy R[1]+R[2]+R[3]=0 mod Q, and R'[1]+R'[2]+R'[3]=0 mod Q (Q is an integer coprime to 3).

[Mode 3]
The secret calculation system according to Mode 1 or 2, wherein the holder holds a local product element U[i]=(S[i]·S'[i]−T[i]·T'[i])/3 mod Q (Q is an integer coprime to 3) calculated using the first and the second multiplicators and the first subtractor, and the $i^{th}$ secret calculation apparatus (i=1, 2, 3) comprises:

an adder that derives a sum X[i] of U[i] and V[i];

a communicator that transmits the sum X[i] calculated by the adder to an $\{(i+1 \bmod 3)+1\}^{th}$ secret calculation apparatus and receives a sum X[i mod 3+1] calculated by the adder of an (i mod 3+1)$^{th}$ secret calculation apparatus; and an adder/subtractor that calculates distributed values (S"[i], T"[i]) of a product W·W' on the basis of addition/subtraction using the sum X[i] and the sum X[i mod 3+1]

when V[1], V[2], and V[3] are n-bit random numbers that satisfy V[1]+V[2]+V[3]=0 mod Q.

[Mode 4]
The secret calculation system according to Mode 3, wherein the distributed values are (S"[i], T"[i]) =(X[i]−X[i mod 3+1] mode Q, −2X[i]−X[i mod 3+1]).

[Mode 5]
The secret calculation system according to any one of Modes 1 to 4, wherein the $i^{th}$ secret calculation apparatus (i=1, 2, 3) comprises:

a key generator that generates a K-bit key L[i] (K is a natural number); a pseudorandom number generator that generates an nN-bit random number (N is a natural number) from a K-bit key; and a second subtractor that extracts every n bits from two nN-bit numbers and derives the difference mod Q (Q is an integer coprime to 3), the communicator transmits the key L[i] to an $\{(i+1 \bmod 3)+1\}^{th}$ secret calculation apparatus and receives a key L[i mod 3+1] calculated by the key generator of an (i mod 3+1)$^{th}$ secret calculation apparatus, the pseudorandom number generator generates a first pseudorandom number on the basis of the key L[i] and generates a second pseudorandom number on the basis of the key L[i mod 3+1], and the second subtractor extracts every n bits from the first and the second pseudorandom numbers and calculates the difference mod Q.

[Mode 6]
The secret calculation system according to Mode 5, wherein the adder of the $i^{th}$ secret calculation apparatus (i=1, 2, 3) uses a value calculated by the second subtractor as the random number V[i].

[Mode 7]
As the secret calculation apparatus relating to the second aspect.

[Mode 8]
As the secret calculation method relating to the third aspect.

[Mode 9]
The secret calculation method according to Mode 8, wherein the distributed values are $(S[1], T[1])=(R[1], R[3]-W \bmod Q)$, $(S[2], T[2])=(R[2], R[1]-W \bmod Q)$, $(S[3], T[3])=(R[3], R[2]-W \bmod Q)$, $(S'[1], T'[1])=(R'[1], R'[3]-W' \bmod Q)$, $(S'[2], T'[2])=(R'[2], R'[1]-W' \bmod Q)$, $(S'[3], T'[3]) =(R'[3], R'[2]-W' \bmod Q)$ when R[1], R[2], R[3] and R'[1], R'[2], R'[3] are n-bit random numbers that satisfy R[1] +R[2] +R[3] =0 mod Q, and R'[1] +R'[2] +R'[3] =0 mod Q (Q is an integer coprime to 3).

[Mode 10]
The secret calculation method according to Mode 8 or 9 including: having the $i^{th}$ secret calculation apparatus (i=1, 2, 3) hold a local product element U[i]=(S[i]·S'[i]−T[i]·T'[i])/3 mod Q (Q is an integer coprime to 3) calculated using the derived difference;

having the $i^{th}$ secret calculation apparatus derive a sum X[i] of U[i] and V[i];

having the $i^{th}$ secret calculation apparatus transmit the calculated sum X[i] to an $\{(i+1 \bmod 3)+1\}^{th}$ secret calculation apparatus;

having the $i^{th}$ secret calculation apparatus receive a sum X[i mod 3+1] calculated by an (i mod 3+1)$^{th}$ secret calculation apparatus; and having the $i^{th}$ secret calculation apparatus calculate distributed values (S"[i], T"[i]) of a product W·W' on the basis of addition/subtraction using the sum X[i] and the sum X[i mod 3+1]

when V[1], V[2], and V[3] are n-bit random numbers that satisfy V[1]+V[2]+V[3]=0 mod Q.

[Mode 11]
The secret calculation method according to Mode 10, wherein the distributed values are (S"[i], T"[i]) =(X[i]−X[i mod 3+1] mode Q, −2X[i]−X[i mod 3+1]).

Further, the disclosure of each Non-Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, the ranges of the numerical values used in the present description should be interpreted as a numeric value or small range example included in these ranges even in cases where no explanation is provided.

REFERENCE SIGNS LIST

10, 20, 30: secret calculation apparatus
12: holder
14, 16: multiplicator 18, 34: subtractor
22: adder
24: communicator
26: adder/subtractor
28: key generator
32: pseudorandom number generator
36: local multiplicator
38: product redistributor
42: mask generator
100: secret calculation system

What is claimed is:

1. A secret calculation system comprising three secret calculation apparatuses sharing an n-bit number W and an n-bit W' (n=any natural number) in secret to each other, wherein
an $i^{th}$ secret calculation apparatus (i=1, 2, 3) comprises:
a holder that holds (S[i], T[i]) and (S'[i], T'[i]) as distributed values of the n-bit number W and the n-bit W', respectively; and
a hardware processor configured to implement:
a first multiplicator that derives a logical conjunction of S[i] and S'[i];
a second multiplicator that derives a logical conjunction of T[i] and T'[i]; and
a first subtractor that derives a difference between the logical conjunction derived by the first multiplicator and the logical conjunction derived by the second multiplicator.

2. The secret calculation system according to claim 1, wherein
the distributed values are $$(S[1], T[1])=(R[1], R[3]-W \bmod Q),$$

$$(S[2], T[2])=(R[2], R[1]-W \bmod Q),$$

$$(S[3], T[3])=(R[3], R[2]-W \bmod Q),$$

$$(S'[1], T'[1])=(R'[1], R'[3]-W' \bmod Q),$$

$$(S'[2], T'[2])=(R'[2], R'[1]-W' \bmod Q),$$

$$(S'[3], T'[3])=(R'[3], R'[2]-W' \bmod Q)$$

when R[1], R[2], R[3] and R'[1], R'[2], R' [3] are n-bit random numbers that satisfy R[1]+R[2]+R[3]=0 mod Q, and R'[1]+R'[2]+R'[3]=0 mod Q (Q is an integer coprime to 3).

3. The secret calculation system according to claim 1, wherein
the holder holds a local product element U[i]=(S[i]·S'[i]−T[i]·T'[i])/3 mod Q (Q is an integer coprime to 3) calculated using the first and the second multiplicators and the first subtractor, and
wherein the hardware processor of the $i^{th}$ secret calculation apparatus (i=1, 2, 3) further configured to implement:
an adder that derives a sum X[i] of U[i] and V[i];
a communicator that transmits the sum X[i] calculated by the adder to an $\{(i+1 \bmod 3)+1\}^{th}$ secret calculation apparatus and receives a sum X[i mod 3+1] calculated by the adder of an (i mod 3+1)$^{th}$ secret calculation apparatus; and
an adder/subtractor that calculates distributed values (S"[i], T"[i]) of a product W·W' on the basis of addition/subtraction using the sum X[i] and the sum X[i mod 3+1]
when V[1], V[2], and V[3] are n-bit random numbers that satisfy V[1]+V[2]+V[3]=0 mod Q.

4. The secret calculation system according to claim 3, wherein the distributed values are (S"[i], T"[i])=(X[i]−X[i mod 3+1] mode Q, −2X[i]−X[i mod 3+1]).

5. The secret calculation system according to claim 1, wherein
the hardware processor of the $i^{th}$ secret calculation apparatus (i=1, 2, 3) further configured to implement:
a key generator that generates a K-bit key L[i] (K is a natural number);
a pseudorandom number generator that generates an nN-bit random number (N is a natural number) from a K-bit key; and
a second subtractor that extracts every n bits from two nN-bit numbers and derives the difference mod Q (Q is an integer coprime to 3),
the communicator transmits the key L[i] to an $\{(i+1 \bmod 3)+1\}^{th}$ secret calculation apparatus and receives a key L[i mod 3+1] calculated by the key generator of an (i mod 3+1)$^{th}$ secret calculation apparatus,
the pseudorandom number generator generates a first pseudorandom number on the basis of the key L[i] and generates a second pseudorandom number on the basis of the key L[i mod 3+1], and
the second subtractor extracts every n bits from the first and the second pseudorandom numbers and calculates the difference mod Q.

6. The secret calculation system according to claim 5, wherein the adder of the $i^{th}$ secret calculation apparatus (i=1, 2, 3) uses a value calculated by the second subtractor as the random number V[i].

7. A secret calculation apparatus included in the secret calculation system according to claim 1.

8. A secret calculation method using three secret calculation apparatuses sharing an n-bit number W and an n-bit W' (n=any natural number) in secret to each other, the secret calculation method including:
having an $i^{th}$ secret calculation apparatus (i=1, 2, 3) hold (S [i], T[i]) and (S'[i], T'[i]) as distributed values of an n-bit number W and the n-bit W', respectively;
having the $i^{th}$ secret calculation apparatus derive a logical conjunction of S[i] and S'[i] as a first logical conjunction;
having the $i^{th}$ secret calculation apparatus derive a logical conjunction of T[i] and T'[i] as a second logical conjunction; and
having the $i^{th}$ secret calculation apparatus derive a difference between the first logical conjunction and the second logical conjunction.

9. The secret calculation method according to claim 8, wherein
the distributed values are $$(S[1], T[1])=(R[1], R[3]-W \bmod Q),$$

$$(S[2], T[2])=(R[2], R[1]-W \bmod Q),$$

$$(S[3], T[3])=(R[3], R[2]-W \bmod Q),$$

$$(S'[1], T'[1])=(R'[1], R'[3]-W' \bmod Q),$$

$$(S'[2], T'[2])=(R'[2], R'[1]-W' \bmod Q),$$

$$(S'[3], T'[3])=(R'[3], R'[2]-W' \bmod Q)$$

when R[1], R[2], R[3] and R' [1], R'[2], R'[3] are n-bit random numbers that satisfy R[1]+R[2]+R[3]=0 mod Q, and R'[1]+R'[2]+R'[3]=0 mod Q (Q is an integer coprime to 3).

10. The secret calculation method according to claim 8 including:

- having the $i^{th}$ secret calculation apparatus (i=1, 2, 3) hold a local product element $U[i]=(S[i] \cdot S'[i]-T[i] \cdot T'[i])/3 \mod Q$ (Q is an integer coprime to 3) calculated using the derived difference;
- having the $i^{th}$ secret calculation apparatus derive a sum $X[i]$ of $U[i]$ and $V[i]$;
- having the $i^{th}$ secret calculation apparatus transmit the calculated sum $X[i]$ to an $\{(i+1 \mod 3)+1\}^{th}$ secret calculation apparatus;
- having the $i^{th}$ secret calculation apparatus receive a sum $X[i \mod 3+1]$ calculated by an $(i \mod 3+1)^{th}$ secret calculation apparatus; and
- having the $i^{th}$ secret calculation apparatus calculate distributed values ($S''[i]$, $T''[i]$) of a product $W \cdot W'$ on the basis of addition/subtraction using the sum $X[i]$ and the sum $X[i \mod 3+1]$ when $V[1]$, $V[2]$, and $V[3]$ are n-bit random numbers that satisfy $V[1]+V[2]+V[3]=0 \mod Q$.

* * * * *